United States Patent [19]

Schwarz et al.

[11] 4,243,359
[45] Jan. 6, 1981

[54] ROTOR STRUCTURE, ESPECIALLY FOR HINGELESS ROTARY WING AIRCRAFT

[75] Inventors: Alois Schwarz, Putzbrunn; Karlheinz Mautz, Ottobrunn; Michael Stephan, Munich, all of Fed. Rep. of Germany

[73] Assignee: Messerschmitt-Bolkow-Blohm Gesellschaft mit beschrankter Haftung, Munich, Fed. Rep. of Germany

[21] Appl. No.: 972,878

[22] Filed: Dec. 26, 1978

[30] Foreign Application Priority Data

Jan. 18, 1978 [DE] Fed. Rep. of Germany ....... 2801943

[51] Int. Cl.³ ............................................. B64C 27/48
[52] U.S. Cl. .................................. 416/138; 416/134 A
[58] Field of Search ................... 416/138 R, 136, 141, 416/134 A, 140

[56] References Cited

U.S. PATENT DOCUMENTS

| 3,465,831 | 9/1969 | Ferris et al. ...................... 416/136 X |
| 3,470,962 | 10/1969 | Cure ................................... 416/141 X |
| 3,578,877 | 5/1971 | Mautz ........................... 416/138 A X |
| 3,640,643 | 2/1972 | Monti .................................... 416/136 |

FOREIGN PATENT DOCUMENTS

| 642206 | 7/1962 | Italy ...................................... 416/138 A |
| 751109 | 6/1956 | United Kingdom ..................... 416/136 |
| 1192427 | 5/1970 | United Kingdom ................ 416/134 A |

Primary Examiner—Everette A. Powell, Jr.
Attorney, Agent, or Firm—W. G. Fasse; D. F. Gould

[57] ABSTRACT

The present hingeless rotor structure, especially for rotary wing aircraft, comprises at least one pair of rotor blades, whereby the blades of a pair are arranged diametrically opposite each other. The blades are secured to a rotor head for proper blade angle adjustment. Each blade has its root or radially inner end secured in a blade root sleeve which in turn is held in a respective blade angle bearing bushing. The blades of a pair are interconnected by a tension resistant, torsionally yielding member. One bearing which is pressure loadable in the direction of the longitudinal blade axis is provided for each blade pair between one of the respective blade root sleeves and the corresponding blade angle bearing bushing. The tension resistant, torsionally yielding member is capable of a certain stretching or elongation during operation. In order to compensate for such an elongation, the tension resistant, torsionally yielding members are installed in such a manner that in the rest or non-rotating condition of the blades, the center is radially displaced from the axis of rotation of the rotor head toward the respective pressure loadable bearing by one half of the length of said elongation.

5 Claims, 1 Drawing Figure

U.S. Patent
Jan. 6, 1981
4,243,359
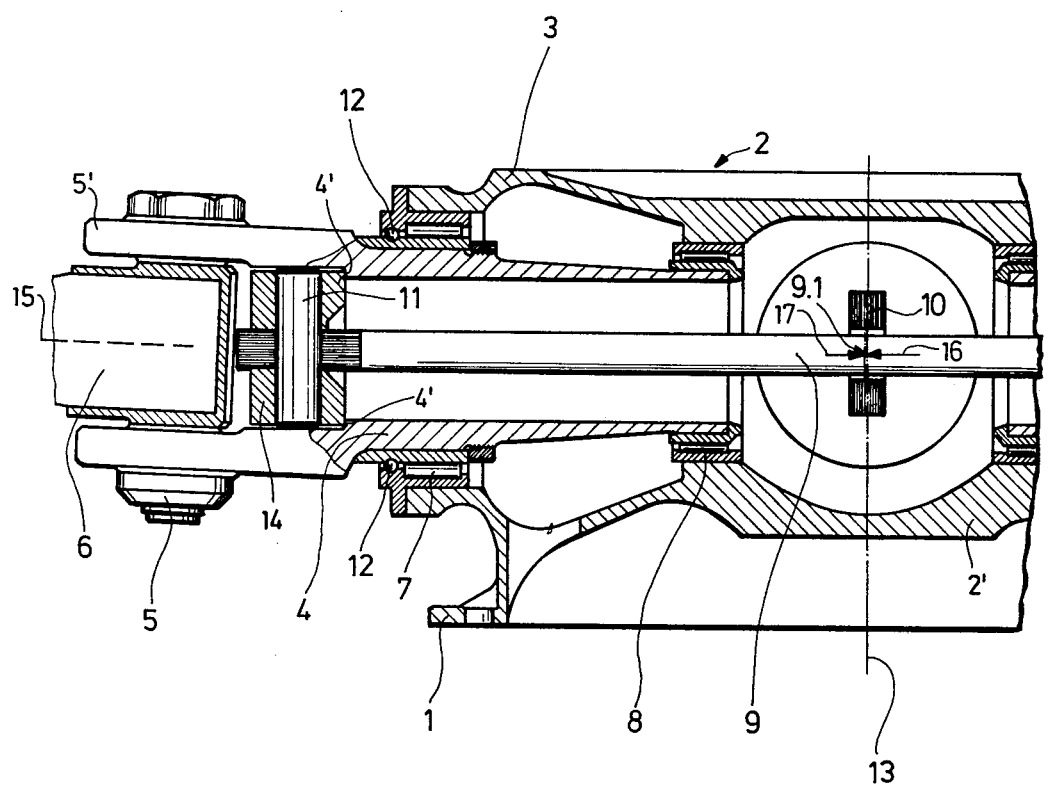

ROTOR STRUCTURE, ESPECIALLY FOR HINGELESS ROTARY WING AIRCRAFT

BACKGROUND OF THE INVENTION

The present invention relates to a rotor structure, especially for hingeless rotary wing aircrafts.

German Pat. No. 1,531,359 discloses a rotor of the type to which the invention relates. In such a rotor, the torsionally yielding connection of the respective pair of rotor blades passes freely through the rotor head center so that the cyclical blade angle adjustment of the two diametrically opposite each other located rotor blades does not result in any twisting of the torsionally yielding connection. In the cyclical blade angle adjustment the two rotor blades of a pair are tilted in the same direction and to the same extent. Thus, the torsion loading of the torsionally yielding connection of the blades of a pair is determined solely by the collective blade angle adjustment. However, practical experience has shown that it is not possible to do without a centering holding structure for securing a rotor blade pair to the rotor head. Such centering holding structure is necessary due to unbalances and vibrations in the longitudinal rotor blade axis. Hence, the just described rotor has not achieved any practical significance.

German Pat. No. 2,150,741 discloses the connection of the rotor blades to the rotor head. It has been customary heretofore to construct the torsionally yielding connections in the form of tension members which connect but one rotor blade root to a central rotor head body which extends coaxially to the rotational axis of the rotor head. This type of structure makes it impossible to avoid that the respective torsional connecting member is twisted in response to each angular movement of the individual rotor blade, said twisting extending all the way to the central rotor head body.

OBJECTS OF THE INVENTION

In view of the above it is the aim of the invention to achieve the following objects singly or in combination:

to provide a centering connection for the blades of a rotor blade pair in a rotor structure for a rotary wing aircraft whereby such connection shall be suitable independently of the number of rotor blade pairs;

the centering connection shall not impair the free passage of the torsionally yielding connection members through the rotor head center;

the centering connection shall minimize the torsion load on the torsionally yielding connecting members;

the centering connection shall be suitable for longitudinal loops as described in German Pat. No. 1,531,359 as well as for other connecting members, for example, tension belts;

to compensate for any unbalances to which the rotor structure may be subject due to stretching or elongation of the blade connecting members; and to minimize the structural costs of the rotor structure while simultaneously assuring the advantages of this type of rotor structure.

SUMMARY OF THE INVENTION

According to the invention there is provided a hingeless rotor structure, especially for rotary wing aircraft, comprising at least one pair of rotor blades having a longitudinal blade axis and arranged diametrically opposite each other, rotor head means having an axis of rotation, securing means operatively connecting said rotor blades to said rotor head means, said securing means comprising blade root sleeve means, blade angle bearing means, and respective blade angle bearing bushing means, and tensionally resistant, torsionally yielding connecting means including connecting holding means for operatively interconnecting the rotor blades of a pair, bearing means capable of taking up pressure loads in the direction of said longitudinal blade axis operatively arranged between only one of said blade root sleeve means and the corresponding blade angle bushing means, said tensionally resistant, torsionally yielding connecting means having a center which is displaced radially relative to said axis of rotation toward the respective pressure load bearing means by a distance corresponding substantially to one half of the elongation to which the respective connecting means are subject in operation, whereby such elongation is compensated by said distance; or rather unbalances are compensated.

It is an advantage of the invention that an especially inexpensive structure holds the rotor blades of a pair in the axial direction and simultaneously centers the blades in operation substantially free of any unbalance. The holding is accomplished in such an eccentrical point of the rotor head that any unbalances that could result due to the stretching or elongation of the respective torsionally yielding connecting elements in the rotor blade axis direction are excluded or compensated. A further advantage is seen in that the holding is accomplished so that any freedom of motion of the torsionally yielding connecting member of the respective rotor blade pair is not impaired. Similarly, the freedom of motion of any other torsionally yielding connections, for example, where the rotor structure comprises more than one pair of blades, is also not impaired. The very small structural expense, which, incidentally, does not at all impair the operational reliability of the present rotors, may also be illustrated by the fact that the pressure take up bearing may be a simple ball bearing, for example, a radial ball bearing capable of taking up radial as well as axial loads.

BRIEF FIGURE DESCRIPTION

In order that the invention may be clearly understood, it will now be described, by way of example, with reference to the accompanying drawings, wherein the single FIGURE illustrates a partial sectional view through a hingeless rotor structure according to the invention with parts broken away to simplify the illustration.

DETAILED DESCRIPTION OF A PREFERRED EXAMPLE EMBODIMENT AND OF THE BEST MODE OF THE INVENTION

The single FIGURE shows, for example, a four-blade hingeless rotor for a rotary wing aircraft whereby the sectional plane extends vertically through the rotational axis 13 of the rotor head 2 of a rotary wing aircraft. The rotor head 2 comprises a housing 2' with a flange 1 for connection to a rotor shaft not shown. Only one arm 3 forming a blade angle bearing bushing is illustrated completely whereas the remaining four blade angle bearing bushings are not shown since they have the same structure and configuration.

A rotor blade 6 or rather four of such blades are connected to their respective blade angle bearing bushing 3 by means of a blade root sleeve 4 secured to the radially inner end or root of the blade 6 by means of a bolt and nut 5 extending through the blade root and through a fork extension 5' of the blade root sleeve 4. The rotor blades 6 are, for example, made of fiber reinforced synthetic material. The root sleeve 4 is operatively secured in the blade angle bearing bushing 3 by ring cylinder roller bearings 7 and 8, for example, in the form of so-called needle bearings by means of which flapping moments and lead-lag moments effective on the rotor blade 6 are introduced into the rotor head 2. Two rotor blades 6 located diametrically opposite each other are operatively interconnected by tensionally resistant, but torsionally yielding connecting means such as belts or loops 9 and 10 made of fiber compound material or of spring steel or the like. The radially outer ends of the connecting belts 9, 10, or the like are secured to the respective blade root sleeve 4 by means of a bolt 11 extending through a holding member 14 resting against a shoulder 4' of the sleeve 4. The connecting elements 9 and 10, although torsionally resistant, are sufficiently yielding against torsional loads to permit the blade angle adjustment. For these purposes the connecting members 9 and 10 may be made of a plurality of tension lamella bonded together, for example, by adhesive means as is well known in the art. The connecting members 9 and 10 form, for example, endless loops as disclosed in the above mentioned German Pat. No. 1,531,359, whereby one loop is arranged in a plane extending perpendicularly to the plane of the other loop so that each loop is located in its own plane, thus avoiding that the loops interfere with each other. Thus, it is possible to locate all rotor blades 6 in a common plane without impairing the freedom of motion of the loops 9, 10 which cross each. However, instead of such loops 9, 10 two belts may be used of which one would have a central opening for the passage of the other.

Besides, the individual rotor blade pairs could be arranged in different planes as disclosed in German Pat. No. 1,531,361 whereby the respective torsionally yielding connecting members would also be located in different planes vertically one above the other, and hence the mutual crossing of the torsionally yielding connections in the rotor head center is avoided. Thus, the present invention is also applicable to a rotor structure comprising, for example, more than two pairs of rotor blades. All materials having a sufficiently durable alternating strength may be used for making the connecting or loop members 9, 10. Hence, fiber reinforced synthetic materials may also be used instead of the spring steel which is normally employed for this purpose.

According to the invention a bearing 12 such as a radial ball-bearing, is operatively interposed between the blade angle bearing bushing 3 and the blade root sleeve 4. The bearing 12 is capable of taking up axial pressure loads which are effective in the direction of the longitudinal blade axis 15 to thereby transmit such loads to the rotor head. Only one such bearing 12 is provided for each pair of rotor blades 6 and the bearing 12 is located eccentrically in the rotor head 2. Thus, forces that may result from unbalances of the respective rotor blade pair are taken up as an axial load by the respective bearing 12 and transmitted to the rotor head 2.

Further, according to the invention the center 9.1 of the connecting member 9 is displaced radially outwardly relative to the axis of rotation 13 of the rotor head toward the bearing 12. The extent of the radially outward displacement of the center 9.1 of the connecting member 9 is indicated between the tips of the arrows 16 and 17. This extent of displacement corresponds substantially to one half of the elongation or stretching to which the connecting member 9 may be subjected in operation. This displacement in the rest position of the rotor blade connecting means compensates for the above mentioned elongation or stretching in the operation of the rotor.

In the drawing the displacement between the arrow heads 16 and 17 is somewhat exaggerated because in practice it has been found that the stretching amounts to about 1 mm for a commonly employed torsionally yielding connection member 9 having a length of about 500 mm. Due to the fact of the eccentric location of the axial load take-up bearing 12, the stretching or elongation of the connecting member 9 can take place only from the connecting bolt 11 toward the rotational axis 13 of the rotor head 2. Thus, according to the invention, the combination of the eccentrically located bearing 12 with the displacement of the center 9.1 makes sure that any stretching or elongation in operation is compensated whereby the rotor blades take up a centered position in the operation of the rotor and a somewhat off-center position in the rest position of the rotor blades. Thus, the invention has the advantage that the predetermined eccentric position of the center 9.1 of the connecting belt or loop 9 in the rest condition f the rotor and relative to the rotational axis 13 practically eliminates any unbalances of the respective rotor blade pair resulting from elongations of the connecting member under a nominal r.p.m. of the rotor. The same applies to any other pair of rotor blades constructed and arranged according to the invention.

Although the invention has been described with reference to specific example embodiments, it will be appreciated, that it is intended, to cover all modifications and equivalents within the scope of the appended claims.

What is claimed is:

1. A hingeless rotor structure, especially for rotary wing aircraft, comprising at least one pair of rotor blades having a longitudinal blade axis and arranged diametrically opposite each other, rotor head means having an axis of rotation, securing means operatively connecting said rotor blades to said rotor head means, said securing means comprising blade root sleeve means, blade angle bearing means and respective blade angle bearing bushing means, and tensionally resistant, torsionally yielding connecting means including connecting holding means for operatively interconnecting the rotor blades of a pair, bearing means capable of taking up pressure loads in the direction of said longitudinal blade axis operatively arranged between only one of said blade root sleeve means and the corresponding blade angle bearing bushing means, said torsionally yielding connecting means having a center which is displaced radially off-center relative to said axis of rotation toward the respective pressure load bearing means by a distance corresponding substantially to one half of an elongation to which the respective torsionally yielding connecting means are subject in operation, whereby the securing means are centered in a manner substantially free of unbalances which are compensated by the off-center displacement of the center of the torsionally yielding connecting means.

2. The rotor structure of claim 1, wherein said pressure load bearing means comprise ball bearing means.

3. The rotor structure of claim 1, wherein said ball bearing means comprise radial ball bearing means.

4. The rotor structure of claim 1, wherein said pressure load bearing means and the respective blade angle bearing means form an integral structure.

5. The rotor structure of claim 4, wherein said integral structure comprises a radial ball bearing (12) for said pressure load and a cylinder roller bearing forming part of said blade angle bearing means.

* * * * *